May 8, 1934.  J. C. MILLER  1,957,661

METER

Filed June 26, 1931

INVENTOR
Jacob C. Miller
BY
Wheeler, Wheeler & Wheeler
ATTORNEYS

Patented May 8, 1934

1,957,661

UNITED STATES PATENT OFFICE 1,957,661

METER

Jacob C. Miller, Milwaukee, Wis., assignor to Badger Meter Manufacturing Company, Milwaukee, Wis., a corporation of Wisconsin Application June 26, 1931, Serial No. 546,943

4 Claims. (Cl. 73—98)

This invention relates to improvements in meters.

It is the object of the invention to produce a fluid motor for meter use which will give accurate registration over the entire range of flowage for which the meter is adapted.

Manufacturers of the fluid motors used to operate meters try to cause the motor to respond by the same number of turns per unit flow of gasoline regardless of whether the rate of flow is high or low. It is particularly true of wobble disk motors used in meters for such light liquids as gasoline, however, that when the device is calibrated to respond accurately to rates of flow in the upper part of its range, the meter will fall far short of a proper response to the lower rates of flow. Accuracy of construction is not a solution. In some cases the more accurately the parts are finished the greater will be the discrepancy between the response of the motor in the lower and higher ranges of flow.

By experimentation it has been found that when the rate of flow is high the resultant pressure on the wobble disk acts approximately at right angles to the partition between the high pressure and the low pressure sides of the meter. When the rate of flow is high and the pressure drop across the meter is relatively great it is believed that this transverse resultant pressure effects an increase in friction which is taken into account in calibrating the meter for high rates of flow and the absence of which allows the rotor to make more revolutions per unit of flow in the lower ranges.

Regardless of the correctness of the foregoing theory the invention herein disclosed, which is based thereon, has been found to operate successfully in overcoming inaccuracies heretofore experienced and has greatly facilitated the accurate calibration of meters throughout their entire range of operation.

In the drawing.

Like parts are identified by the same reference characters throughout the several views.

Figure 1:
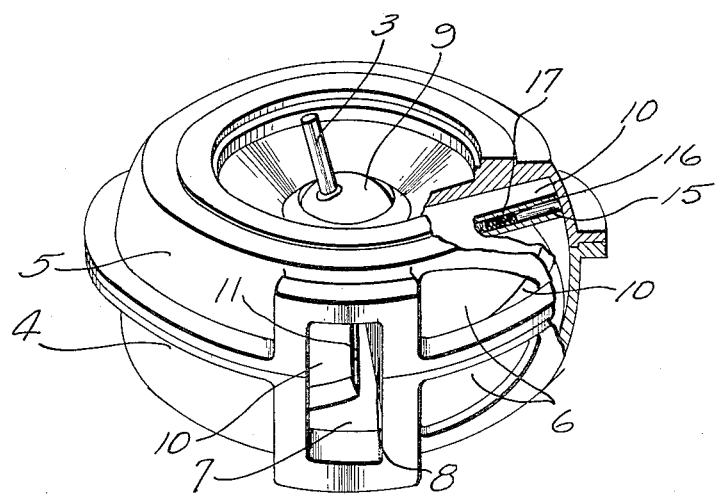
Figure 1 is a view illustrating in perspective a fluid operated motor of conventional design for meter use, the motor casing being broken away to expose the application of the present invention to the wobble disk of the motor.
Figure 2:
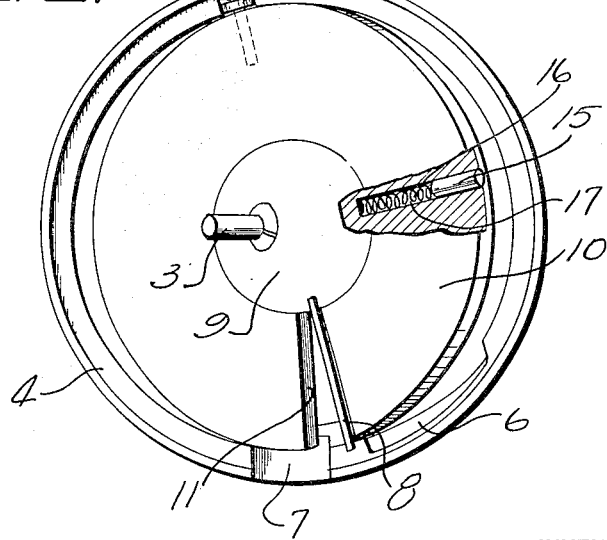
Figure 2 is a plan view of the lower part of the motor casing and the wobble disk therein contained, the face of the disk being broken away to a section exposing a spring pressed plunger incorporated therein in a radial position in accordance with this invention.

It will be understood that the meter in general may correspond to conventional practice. The present invention has nothing to do with the register driven by the orbital movement of the free end of the wobble shaft 3.

The conventional motor casing comprises two parts 4 and 5 having inlet openings at 6 and registering notches providing an outlet opening at 7. Between the inlet and outlet openings is the usual partition 8 extending to the sphere 9 upon which the wobble disk 10 is mounted. The wobble disk is notched at 11 to receive partition 8 and directly opposite the partition is provided in the usual way with a guide roller 12 operating in a groove 13 in the casing.

The only particular in which the meter herein disclosed deviates from standard practice consists in the provision of a spring pressed plunger 15 of bakelite or the like which operates under pressure of spring 16 in a radial bore 17 in the wobble disk 10 which is approximately at right angles to the central radius of slot 11.

The pressure of spring 16 is not heavy but it is sufficient to maintain the end of plunger 15 in frictional pressure engagement with the interior wall of the motor casing, where, in the course of the movement of the disk, the end of the plunger describes a lemniscate figure.

The direction of the reaction pressure corresponds to the direction of the resultant of pressures of the fluid itself as it passes through the meter between ports 6 and 7. Thus there is a tendency for the spring 16 to keep the parts in the same position at low rates of flow which they occupy at high rates of flow. Although the spring and plunger are in the disk in the structure illustrated, it is obvious that the reaction pressure on the disk gives an effect equivalent to the pressure thereon of a spring pressed plunger in the casing.

It is possible that the friction of the plunger also has a bearing on the result. In the manufacture of meters of this type the effort has heretofore been to make the motor as frictionless as is possible. While uncontrolled friction attributable to inaccuracies of manufacture is undoubtedly an undesirable factor from the standpoint of accuracy, it is believed that the provision of a slight but definite amount of friction impeding the free movement of the wobble disk may compensate at low rates of flow for the absence of such friction as is attributable to fluid pressures at high rates of flow.

In any event the addition of the plunger pressed by a light spring satisfactorily corrects over-registration at low flowage rates and greatly facilitates the calibration of the meter as a whole and improves its accuracy over its entire range.

I claim:

1. The combination with a fluid motor casing and a wobble disk therein provided with a radial bore, of a spring within said bore and a plunger reciprocably yieldable within said bore and pressed by said spring into engagement with the casing.

2. In a device of the character described, the combination with a casing having inlet and outlet ports and a partition separating said ports, of a wobble disk within said casing co-acting with said partition and provided with a radial bore, and a spring and plunger within said bore, said plunger being in bearing contact with the casing.

3. In a device of the character described, the combination with a casing having inlet and outlet ports and a partition separating said ports, of a wobble disk mounted in said casing co-acting with said partition and provided with a radial bore substantially at right angles to the radius of said disk in which the partition is positioned, a compression spring within said bore and a plunger guided by said bore acted on by said spring and provided with a bearing on the wall of the casing.

4. In a device of the character described, the combination with a casing having inlet and outlet ports and a partition separating said ports, of a wobble disk mounted in said casing co-acting with said partition and provided with a radial bore substantially at right angles to the radius of said disk in which the partition is positioned, a compression spring within said bore and a plunger guided by said bore acted on by said spring and provided with a bearing on the wall of the casing, said plunger being on the side of the partition nearest the inlet port, whereby the reaction of said spring urges said wobble disk in the direction of fluid pressure toward the outlet port.

JACOB C. MILLER.